US007096132B2

(12) United States Patent
Patrick et al.

(10) Patent No.: US 7,096,132 B2
(45) Date of Patent: Aug. 22, 2006

(54) PROCEDURE FOR ESTIMATING A PARAMETER OF A LOCAL MAXIMA OR MINIMA OF A FUNCTION

(75) Inventors: Christopher Patrick, San Diego, CA (US); Douglas Rowitch, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/687,478

(22) Filed: Oct. 16, 2003

(65) Prior Publication Data
US 2004/0143612 A1 Jul. 22, 2004

Related U.S. Application Data

(60) Provisional application No. 60/419,626, filed on Oct. 17, 2002.

(51) Int. Cl.
*G06F 19/00* (2006.01)
(52) U.S. Cl. ............... 702/66; 702/188; 370/516; 370/517; 708/207
(58) Field of Classification Search ........ 702/66, 702/188; 375/147, 150, 222, 229, 242, 316, 375/324, 335, 343; 370/320, 335, 342, 508, 370/516, 517
See application file for complete search history.

(56) References Cited

U.S. PATENT DOCUMENTS

| | | | | |
|---|---|---|---|---|
| 4,445,118 A | | 4/1984 | Taylor et al. ............... 343/357 |
| 5,228,062 A | * | 7/1993 | Bingham ..................... 375/344 |
| 5,485,224 A | * | 1/1996 | Burns et al. ................ 348/699 |
| 5,774,601 A | | 6/1998 | Mahmoodi .................. 382/298 |
| 5,999,561 A | * | 12/1999 | Naden et al. ............... 375/142 |
| 6,113,653 A | * | 9/2000 | Ashley et al. .............. 704/219 |
| 6,201,828 B1 | * | 3/2001 | El-Tarhuni et al. ......... 375/150 |
| 6,208,291 B1 | | 3/2001 | Krasner ................. 342/357.12 |
| 6,597,733 B1 | * | 7/2003 | Pollmann et al. ........... 375/222 |
| 6,606,346 B1 | * | 8/2003 | Abraham et al. ........... 375/142 |
| 6,614,834 B1 | * | 9/2003 | Meng et al. ................ 375/149 |
| 6,792,035 B1 | * | 9/2004 | Kontola ...................... 375/148 |
| 2002/0154688 A1 | * | 10/2002 | Pollmann et al. ........... 375/229 |
| 2003/0025631 A1 | * | 2/2003 | Kim ........................... 342/198 |
| 2003/0156665 A1 | * | 8/2003 | Sahai et al. ................. 375/343 |
| 2004/0043726 A1 | * | 3/2004 | Rowitch ...................... 455/65 |
| 2004/0120387 A1 | * | 6/2004 | Bultan et al. ............... 375/149 |
| 2004/0176099 A1 | * | 9/2004 | Sahai et al. .............. 455/456.1 |

OTHER PUBLICATIONS

Lai, et al., "Interpolation Method for Time Delay Estimation in the RF-signal Crosscorrelation Technique for Blood Velocity Measurement", Ultrasonics Symposium, 1996, pp. 1211-1215.

* cited by examiner

*Primary Examiner*—Carol S. W. Tsai
(74) *Attorney, Agent, or Firm*—Philip Wadsworth; Bruce Greenhaus; James McFarland

(57) ABSTRACT

A method of and system for estimating a parameter of a local maxima or minima of a function. An interpolated local maxima or minima is determined. An interpolation offset is then derived, comprising a deviation between locations of the interpolated and sampled local maxima or minima of the function. An estimate of the parameter is derived from the interpolation offset.

31 Claims, 17 Drawing Sheets

```
cpLutSize = 128;
cpBias [] = (
+0.015285758262,  +0.016950049216,  +0.019303562700,  +0.021191194936,
+0.022906145335,  +0.024869237538,  +0.026962368583,  +0.028838852156,
+0.030582534518,  +0.032624169261,  +0.034291396644,  +0.036060631279,
+0.037716910951,  +0.039915830596,  +0.040885180451,  +0.042367866177,
+0.043687632764,  +0.045240487285,  +0.046526745281,  +0.047848694297,
+0.049057529806,  +0.050152654510,  +0.051388193312,  +0.052258680156,
+0.053084404166,  +0.053954537121,  +0.054682600593,  +0.055320062121,
+0.055887818766,  +0.056490309488,  +0.056969348842,  +0.057146832235,
+0.057385439342,  +0.057461767747,  +0.057440163317,  +0.057404876826,
+0.057129687852,  +0.056683395511,  +0.056080525109,  +0.055450547936,
+0.054540173069,  +0.053215723734,  +0.051825849246,  +0.050525570011,
+0.048984585171,  +0.047119926953,  +0.045536750027,  +0.043667412317,
+0.041756085605,  +0.039632266692,  +0.037542856753,  +0.035200841715,
+0.032895689965,  +0.030471665121,  +0.027978347062,  +0.025407680027,
+0.022693848765,  +0.019899672911,  +0.017017987363,  +0.014029136190,
+0.010959278861,  +0.007822735900,  +0.004669359043,  +0.001505896164,
-0.001464775405,  -0.004373807389,  -0.007197023949,  -0.009761492890,
-0.012438543001,  -0.014929197049,  -0.017262655793,  -0.019522702105,
-0.021669659152,  -0.023793593241,  -0.025725346621,  -0.027477246458,
-0.029300009403,  -0.030801913926,  -0.032325752340,  -0.033979637553,
-0.035096725534,  -0.036164992030,  -0.037285472726,  -0.038245705252,
-0.038811099246,  -0.039388951001,  -0.039825459872,  -0.040133999624,
-0.040454429177,  -0.040429761090,  -0.040328420817,  -0.040154379733,
-0.039869133425,  -0.039672143420,  -0.039063049659,  -0.038572038619,
-0.037959777404,  -0.037097606397,  -0.036349917084,  -0.035392561919,
-0.034447843527,  -0.033424447919,  -0.032411277261,  -0.031260593420,
-0.029957143436,  -0.028599576009,  -0.027161857310,  -0.025737790522,
-0.024332296153,  -0.022666902258,  -0.021150091131,  -0.019555530970,
-0.017753101701,  -0.015928018884,  -0.014217771393,  -0.012494372374,
-0.010532858803,  -0.008707072303,  -0.006548922196,  -0.004732257679,
-0.002563640444,  -0.000602293572,  -0.001413794948,  -0.003452277493,
+0.005681842200,  +0.007643083210,  +0.009672718970,  +0.011759304259,
+0.011759304259
```

```
cpCNoLutSize = 32;
cpCNoBias[] = {
    -0.665600379319,   -0.643115517442,   -0.624975162632,
    0.595938992723,
    0.559287765568,    -0.520404507886,   -0.459530313216,
    0.397912473965,
    0.320679592548,    -0.227358638363,   -0.169149485509,
    0.134115121894,
   -0.093248854233,    -0.042209127976,   +0.013900697875,
   +0.030229838211,
   -0.026335463474,    -0.071392496579,   -0.112745818053,
    0.143499048259,
   -0.200023763999,    -0.294269878656,   -0.374278804318,
   -0.436007895727,
   -0.489039110388,    -0.535137291211,   -0.572100812773,
   -0.600209370055,
   -0.622671437269,    -0.635509030633,   -0.655686931629,
    0.686092980657,
   -0.686092980657
};
```

FIGURE 13

```
dpCNoLutSize = 32;
dpCNoBias[] = (
   -0.447625938630,  -0.427243082428,  -0.401452304661,
 0.378573357445,  -0.313474710834,  -0.279382766770,
 -0.346329974586,  -0.166313079246,  -0.123529683544,
 -0.240728437705,  -0.031403402449,  -0.011186913475,
 -0.202787086851,  -0.010672131763,  -0.028183991495,
 0.086167776981,  -0.122995196884,  -0.160382351203,
 -0.056607438349,  -0.278601619497,  -0.311314354758,
 -0.000663167417,  -0.400323296813,  -0.423945484909,
 +0.000565629518,
 0.053913132592,
 -0.086935554183,
 0.198874450707,
 -0.240515393742,
 0.345037167628,
 -0.371881792820,
 0.445915062820
 -0.445915062820
);
```

FIGURE 15

PROCEDURE FOR ESTIMATING A PARAMETER OF A LOCAL MAXIMA OR MINIMA OF A FUNCTION

RELATED APPLICATIONS

This application claims priority to U.S. Provisional Application No. 60/419,626, filed on Oct. 17, 2002.

FIELD OF THE INVENTION

This invention relates to the fields of position determination, quadratic interpolation, and GPS geo-location systems, and, more specifically, to procedures for estimating a parameter, such as location or scale factor, of a local maxima or minima of a function, such as a GPS correlation function.

RELATED ART

The GPS geo-location system is a system of earth orbiting satellites from which entities visible to the satellites are able to determine their position. Each of the satellites transmits a signal marked with a repeating PN code of 1,023 chips uniquely identifying the satellite. The 1,023 chips repeat every millisecond. The signal is also modulated with data bits, where each data bit has a 20 ms duration in the modulated signal.

Referring to FIG. 1, subscriber station 100 in a wireless communications system receives transmissions from GPS satellites 102a, 102b, 102c, 102d visible to the station, and derives various measurements and related values from each of four or more of the transmissions. The station 100 then communicates the measurements and values to position determination entity (PDE) 104, which estimates the location and velocity of the station 100 from these measurements and values. Alternatively, the station 100 determines its own position and velocity from these measurements and values.

The station 100 searches for a transmission from a particular satellite by correlating the PN code for the satellite with the received signal, which typically is a composite of transmissions from one or more of the satellites which are visible to the station's receiver in the presence of noise. The correlation is typically performed in two dimensions. In the first dimension, the code phase dimension, the correlation is performed over a range of possible shifts of the PN code known as the search window W. Each correlation is performed over an integration time I which may be expressed as the product of $N_c$ and M, where $N_c$ is the coherent integration time, and M is number of coherent integrations which are non-coherently combined. In the second dimension, the Doppler frequency dimension, the correlation is performed over a range of Doppler frequency hypotheses.

The resulting correlation values define a two-dimensional correlation function. The correlation function is sampled, and the peaks of the correlation function located along each of the two dimensions. Typically, the peaks are also compared to a predetermined threshold selected so that the false alarm probability is at or below a predetermined value. The location of the largest peak in the code phase dimension forms a time measurement for the satellite. Similarly, the location of the largest peak in the Doppler frequency dimension forms a Doppler frequency measurement for the satellite. Peak energy measurements are also derived from the height of the largest peak in both the code phase or Doppler frequency dimensions.

Due to lack of synchronization with the sampling clock, there is often a divergence between the sampled and actual peak locations, in both the code phase and Doppler frequency dimensions, and between the sampled and actual peak heights in both dimensions.

Interpolation is often applied to the samples of the correlation function in an effort to more accurately estimate the locations and heights of the actual peaks. In quadratic interpolation, for example, a quadratic function is fitted to three samples of the correlation function. The peak of the quadratic function is often a more accurate estimate of the actual peak than is the sampled peak.

However, the shape of a GPS correlation function, in either the code phase or Doppler frequency dimensions, rarely resembles a quadratic function. The actual correlation pulse shape will depend on the exact filtering used in the receive chain of the receiver and the search parameters $N_C$ and M. Consequently, the interpolated and actual peak locations will often diverge from one another as will the interpolated and actual peak heights.

FIG. 2 illustrates a pulse 202 of a GPS correlation function in the code phase dimension. The shape of this particular pulse corresponds to a particular set of filters and a setting of the parameter $N_C$ equal to 20 ms. The peak of this pulse is located at 0 chips, and the height (in normalized terms) is 1. A first quadratic function 206 is fitted to samples 204b, 204d, and 204f of the pulse 202. A second quadratic function 208 is fitted to samples 204a, 204c, and 204e of the pulse 202. The location 210 of the peak of the first quadratic function 206 and the location 212 of the peak of the second quadratic function 208 both deviate from the location of the true peak (0 chips). Similarly, the height 214 of the peak of the first quadratic function 206 and the height 216 of the second quadratic function 208 both deviate from the height of the true peak (1 in normalized terms).

Consequently, position and velocity estimates derived from interpolated peak locations and heights will often be erroneous. The error in locating the peak of the correlation function in the code phase dimension can give rise to a significant error in the position estimate. In the particular example illustrated in FIG. 2, the error in locating the peak gives rise to an error of ±15 m in the position estimate.

Moreover, currently available interpolation procedures which provide more precision than quadratic interpolation are expensive and time-consuming, and therefore less suitable for mass market consumer electronic devices such as wireless handsets.

SUMMARY OF THE INVENTION

A method is described of estimating a parameter of a local maxima or minima of a function. In one embodiment, the method begins by performing interpolation on samples of the function at or near a local maxima or minima, resulting in an interpolated local maxima or minima.

Then, an interpolation offset is derived. The interpolation offset is a deviation between locations of the interpolated local maxima or minima and a sampled local maxima or minima. A parameter estimate is then derived from the interpolation offset.

In one embodiment, the function is a two-dimensional correlation function, having a code phase dimension and a Doppler frequency dimension. The parameter which is sought to be determined is the location or scale factor of a peak of the correlation function along one of the two dimensions. A quadratic function is fit to a plurality of samples of the correlation function at or near the peak, and the peak of the quadratic function then determined.

An interpolation offset is then derived, equal to the difference between the location of the peak of the quadratic function and the location of the sampled peak. A parameter of the peak, such as its location or height, is then determined from the interpolation offset.

In one implementation, a parameter bias has a pre-existing relationship with the interpolation offset. In this implementation, the parameter estimate is derived using a two-step process. First, the parameter bias corresponding to the interpolation offset is derived using the pre-existing relationship. Second, an estimate of the parameter is derived from the parameter bias.

In one example, the parameter which is sought to be estimated is the location of a peak of the correlation function along the code phase dimension. An interpolation offset is derived, equal to the difference between the locations of the interpolated and sampled peaks along the code phase dimension. A code phase bias corresponding to this interpolation offset is then determined through an access to a lookup table embodying a pre-existing relationship which is present between these two variables. This code phase bias is added to the interpolation offset to yield an estimate of the location of the peak along the code phase dimension.

In a second example, the parameter which is sought to be estimated is the height of a peak of the correlation function along the code phase dimension. An interpolation offset is derived, again equal to the difference between the locations of the interpolated and sampled peaks along the code phase dimension. A peak energy bias corresponding to this interpolation offset is then determined through an access to a lookup table embodying a pre-existing relationship which is present between these two variables. This peak energy bias is added to the interpolated peak energy to yield an estimate of the height of the peak along the code phase dimension.

In a third example, the parameter which is sought to be estimated is the location of a peak of the correlation function along the Doppler frequency dimension. An interpolation offset is derived, equal to the difference between the interpolated and sampled peaks along the Doppler frequency dimension. A Doppler frequency bias corresponding to this interpolation offset is determined through an access to a lookup table embodying a pre-existing relationship which is present between these two variables. This Doppler frequency bias is added to the interpolation offset to yield an estimate of the location of the peak along the Doppler frequency dimension.

In a fourth example, the parameter which is sought to be estimated is the height of a peak of the correlation function along the Doppler frequency dimension. An interpolation offset is derived, again equal to the difference between the interpolated and sampled peaks along the Doppler frequency dimension. A peak energy bias corresponding to this interpolation offset is determined through a pre-existing relationship which is present between these two variables. This peak energy bias is added to the interpolated peak energy to yield an estimate of the height of the peak along the Doppler frequency dimension.

Memories tangibly embodying these methods, and related systems, are also described.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 9 is an example of a lookup table implementing the relationship of FIG. 8.

FIG. 13 illustrates an example of a lookup table implementing the relationship of FIG. 12.

FIG. 15 illustrates an example of a lookup table implementing the relationship of FIG. 14.

DETAILED DESCRIPTION

As utilized herein, terms such as "about" and "substantially" are intended to allow some leeway in mathematical exactness to account for tolerances that are acceptable in the trade. Accordingly, any deviations upward or downward from the value modified by the terms "about" or "substantially" in the range of 1% to 20% should be considered to be explicitly within the scope of the stated value.

Moreover, as used herein, the term "software" includes source code, assembly language code, binary code, firmware, macro-instructions, micro-instructions, or the like, or any combination of two or more of the foregoing.

Furthermore, the term "memory" refers to any processor-readable medium, including but not limited to RAM, ROM, EPROM, PROM, EEPROM, disk, floppy disk, hard disk, CD-ROM, DVD, or the like, or any combination of two or more of the foregoing, on which may be stored a series of software instructions executable by a processor.

The terms "processor" or "CPU" refer to any device capable of executing a series of instructions and includes, without limitation, a general- or special-purpose microprocessor, finite state machine, controller, computer, digital signal processor (DSP), or the like.

Introduction to Correlation Functions and Interpolation Error

Figure 1:
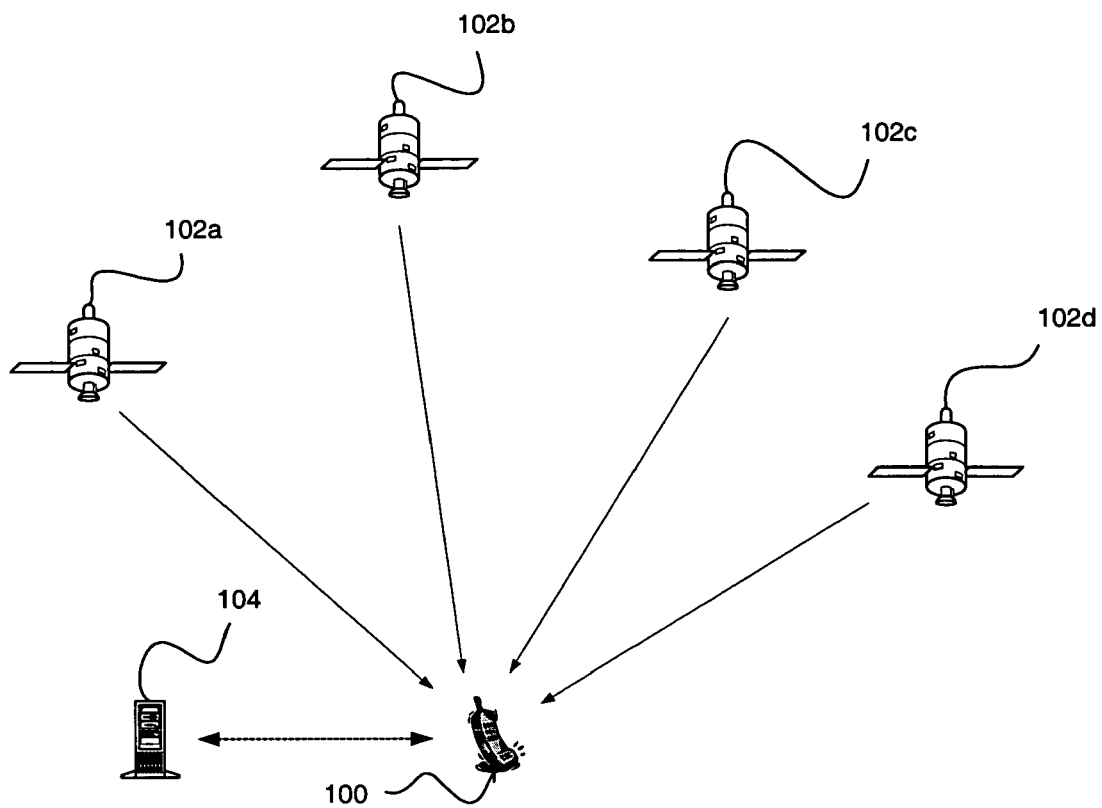
FIG. 1 is a diagram of a GPS geo-location system.
Figure 2:
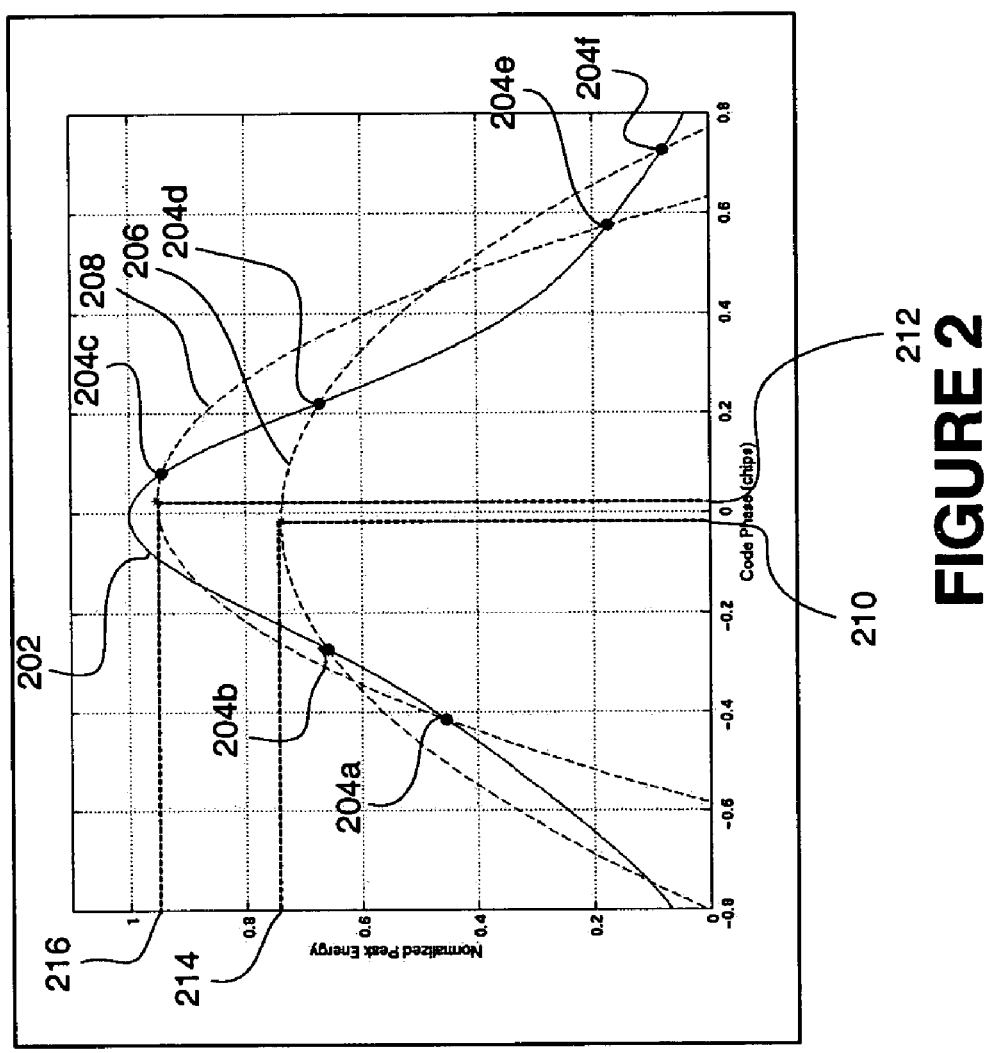
FIG. 2 is a diagram illustrating interpolation error in a correlation function derived from a received signal in a GPS geo-location system.
Figure 3:
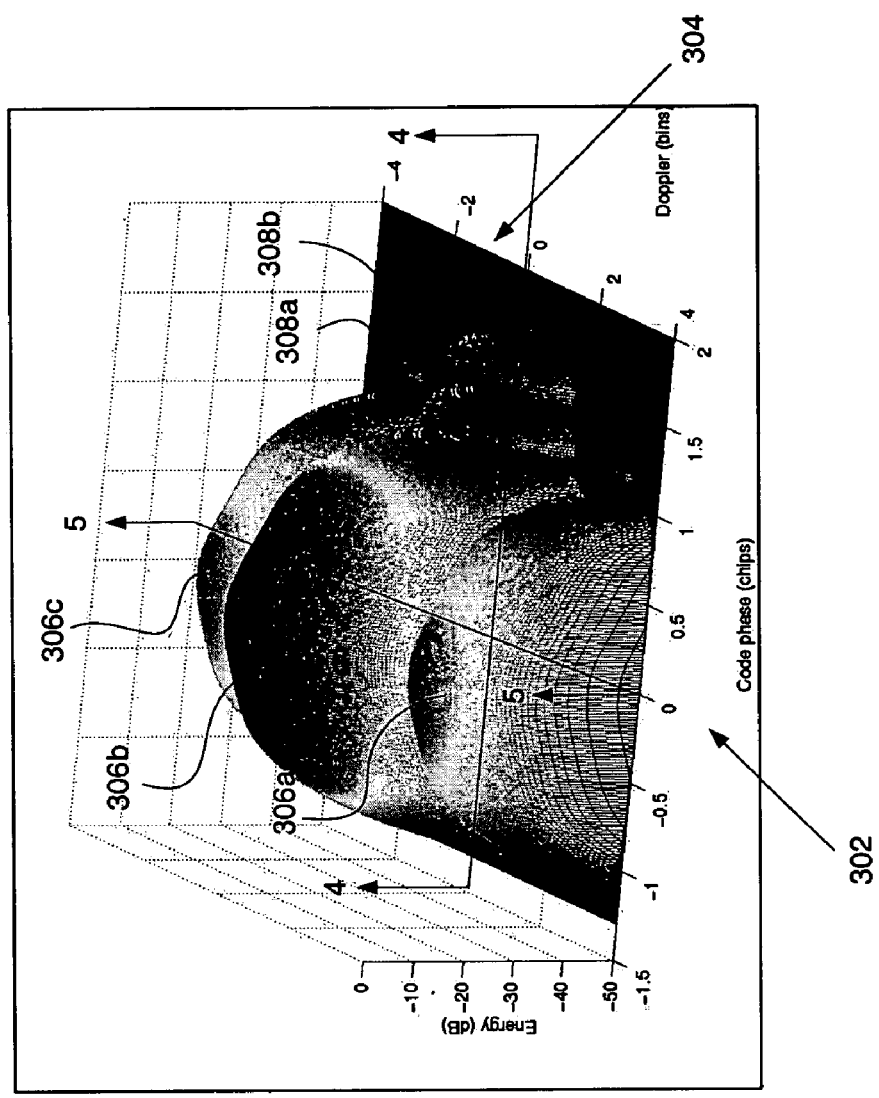
FIG. 3 illustrates an example of a two-dimensional GPS correlation function, wherein the first dimension is the code phase dimension and the second dimension is the Doppler frequency dimension.

FIG. 3 illustrates an example of a two-dimensional correlation function derived from a received signal in a GPS geo-location system. The received signal is a composite signal comprising one or more component signals each transmitted by a GPS satellite.

The correlation function is derived by correlating the received signal with a PN code for one of the satellites. The correlations are performed over a plurality of code phase and Doppler frequency hypotheses. The correlation function represents the correlated energy, in dB or in linear terms, plotted along two dimensions, a code phase dimension and a Doppler frequency dimension. In the example illustrated in FIG. 3, the code phase dimension is identified with numeral 302, and the Doppler frequency dimension is identified with numeral 304.

In the example illustrated in FIG. 3, along the Doppler frequency dimension 304, the correlation function consists of a main lobe 306b and two sidelobes 306a, 306c. Along the code phase dimension 302, the correlation function consists of the main lobe 306b and two sidelobes 308a, 308b. Other examples are possible, so nothing in the foregoing should be taken as limiting.

Figure 4:
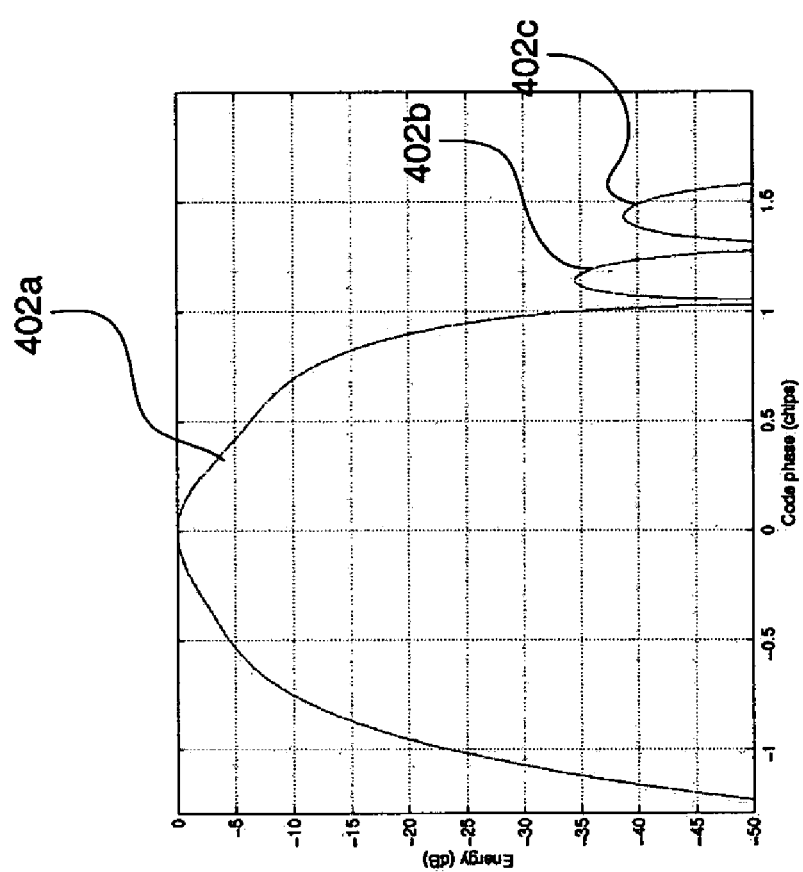
FIG. 4 illustrates an example of a pulse of a GPS correlation function along the code phase dimension.

FIG. 4 illustrates a side view of the correlation function of FIG. 3 along the axis 4—4 in FIG. 3. As shown, the main lobe 306b give rises to a main pulse 402a, and the sidelobes 308a, 308b give rise to two side pulses 402b, 402b. The main pulse 402a is the relevant pulse for position determination purposes.

Figure 5:
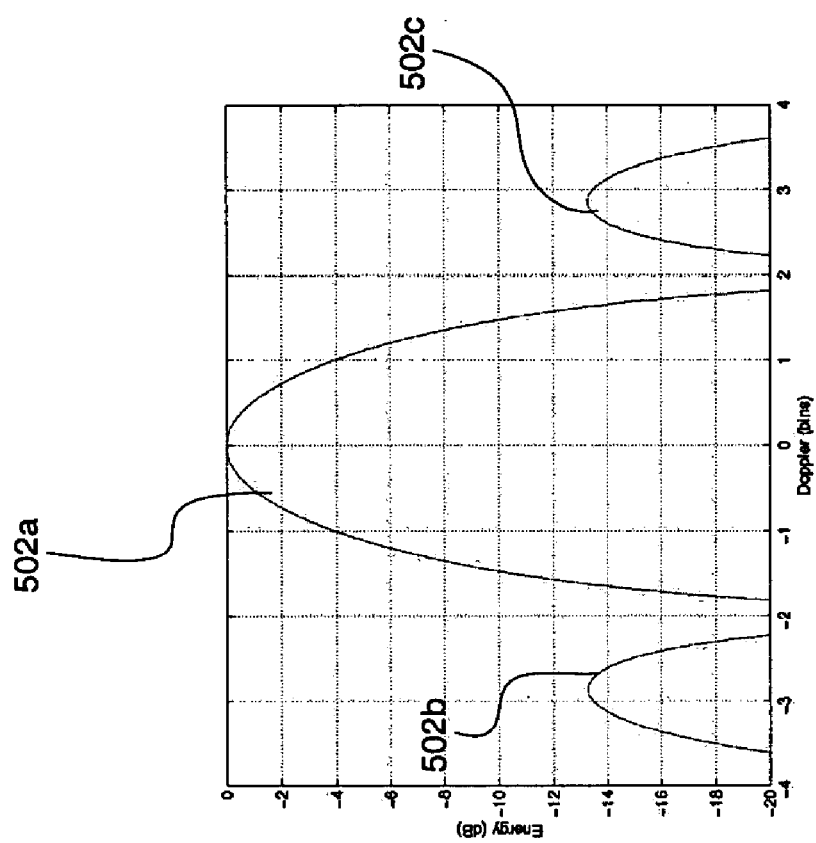
FIG. 5 illustrates an example of a pulse of a GPS correlation function along the Doppler frequency dimension.

FIG. 5 illustrates a side view of the correlation function of FIG. 3 along the axis 5—5 in FIG. 3. As shown, the main lobe 306b gives rise to the main pulse 502a, and the sidelobes 306a, 306c give rise to two side pulses 502b, 502c. The main pulse 502a is the relevant pulse for position determination purposes.

Figure 6:
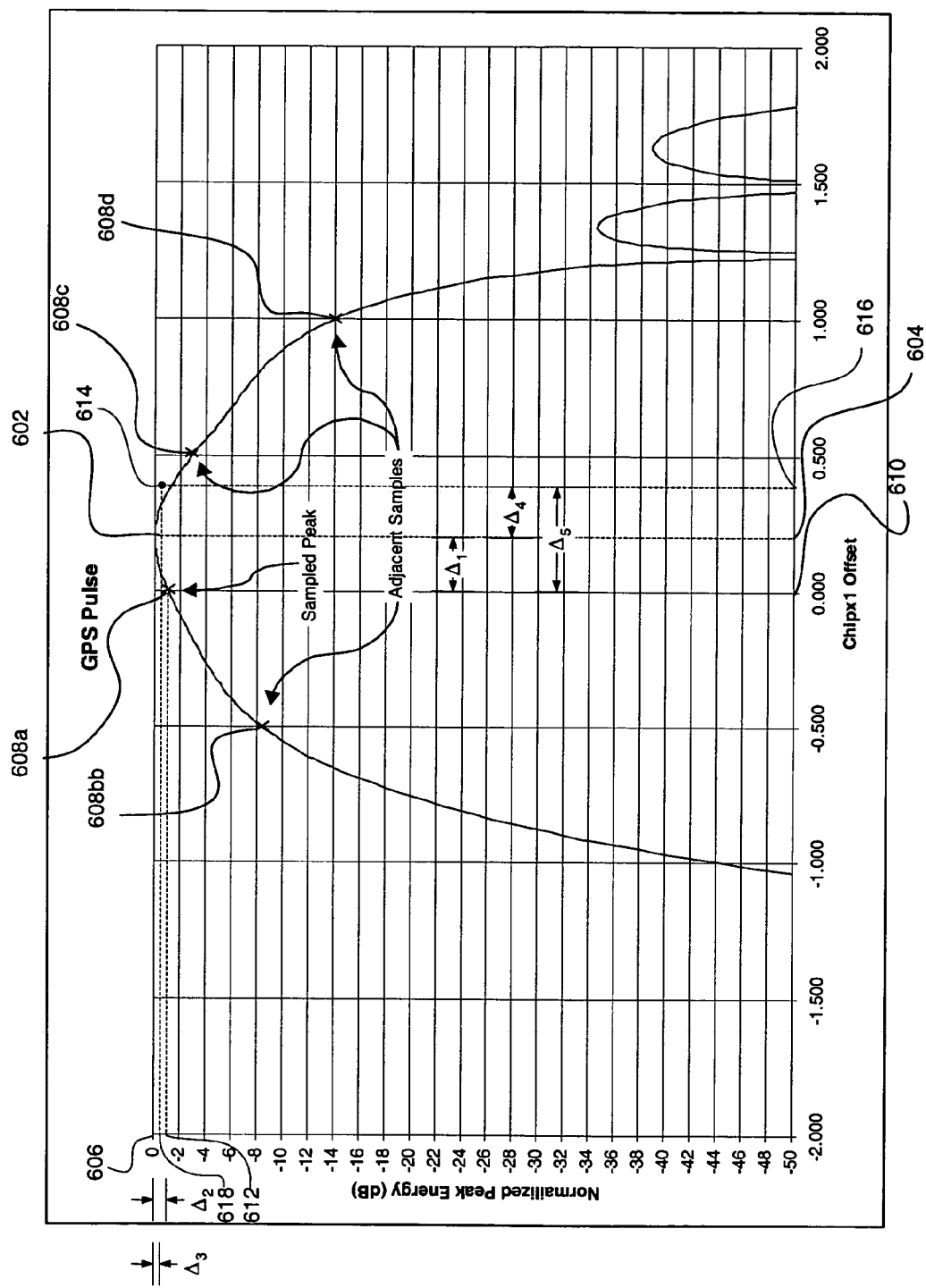
FIG. 6 is a diagram illustrating interpolation offset and parameter bias in the context of a pulse of a GPS correlation function along the code phase dimension.

A peak of the correlation function is characterized by one or more peak parameters. Examples include the location of the peak in the code phase dimension, the location of the peak in the Doppler frequency dimension, and the height (energy) of the peak in either dimension. In FIG. 6, which illustrates the pulses of FIG. 4 at a higher level of detail, the location of the peak 602 in the code phase dimension is identified with numeral 604, and the normalized energy of the peak (in terms of dB) is identified with numeral 606. These parameters are referred to as "actual" peak parameters.

The sampled peak, which is the sample closest in height to the actual peak, is identified with numeral 608a. The sampled peak is characterized by one or more sampled peak parameters, including the location 610 of the sampled peak in the code phase dimension, the location (not shown in FIG. 6) of the sampled peak in the Doppler frequency dimension, and the normalized energy of the sampled peak, identified with numeral 612.

There is usually a deviation between the sampled and actual peaks due to the asynchronous nature of the sampling clock in relation to the actual peak location. This translates into a deviation between the actual and sampled peak parameters. In FIG. 6, for example, the deviation between the actual and sampled peak locations in the code phase dimension is $\Delta_1$, and the deviation between the actual and sampled peak heights is $\Delta_2$.

An interpolated peak is identified with numeral 614. This interpolated peak, which is assumed to have been derived through quadratic interpolation applied to the samples 608a, 608b, and 608c, is characterized by one or more parameters, including the location 616 of the interpolated peak in the code phase dimension, the location (not shown) of the interpolated peak in the Doppler frequency dimension, and the height 618 of the interpolated peak.

The deviation between a parameter, such as location or scale factor, of the interpolated peak and of the actual peak is the interpolation error. In FIG. 6, the interpolation error between the actual and interpolated peak heights is $\Delta_3$, and the interpolation error between the actual and interpolated peak locations along the code phase dimension is $\Delta_4$.

EMBODIMENTS OF THE INVENTION

Figure 7:
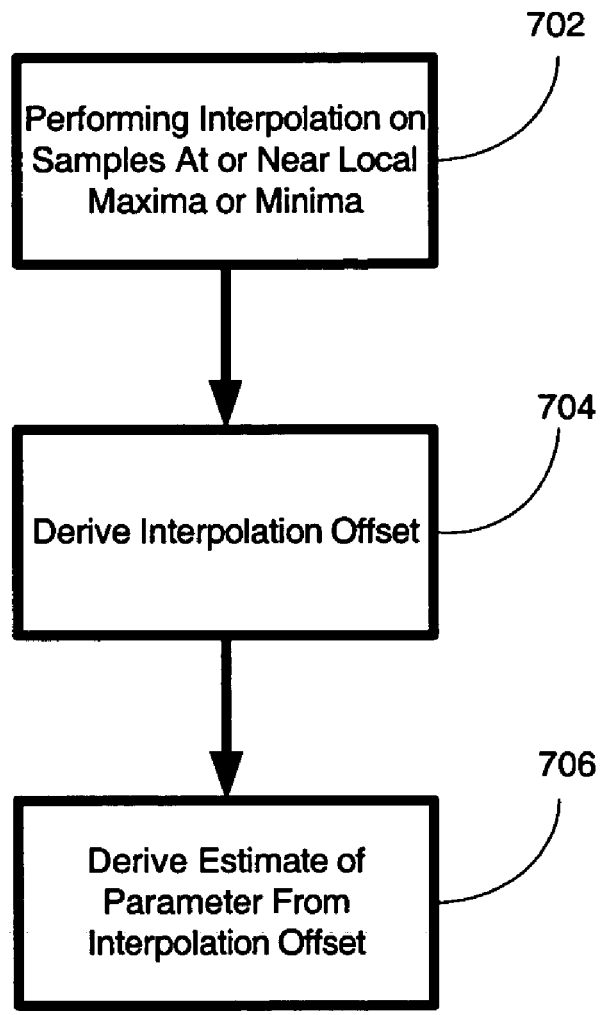
FIG. 7 illustrates a flowchart of an embodiment of a method of estimating a parameter of a local maxima or minima of a function according to the invention.

FIG. 7 illustrates a flowchart of an embodiment of a method of estimating a parameter of a local maxima or minima of a function. The method begins with step 702. In step 702, the method comprises performing interpolation on samples of the function at or near a local maxima or minima, resulting in an interpolated local maxima or minima. In one implementation, the function is a two-dimensional correlation function, having a code phase dimension and a Doppler frequency dimension. In this implementation, step 702 comprises fitting a quadratic function to three samples at or near a peak of the correlation function along one of the two dimensions, and then determining the peak of the quadratic function.

Step 704 follows step 702. Step 704 comprises deriving an interpolation offset. The interpolation offset is the difference between the location of the interpolated local maxima or minima determined in step 702 and the location of a sampled local maxima or minima. In one example, the sampled local maxima or minima is the largest or smallest sample (corresponding respectively to whether a local maxima or minima is involved) within the plurality of samples used in the interpolation process.

In one embodiment, the interpolation offset is the difference between the locations of the interpolated and sampled local maxima or minima of the correlation function along either the code phase or Doppler frequency dimensions. In FIG. 6, for example, the interpolation offset is the difference $\Delta_5$ between the locations of the sampled and interpolated peaks along the code phase dimension.

Turning back to FIG. 7, from step 704, the method proceeds to step 706. In step 706, the method comprises deriving an estimate of the parameter from the interpolation offset.

In one embodiment, step 706 comprises deriving a parameter bias from the interpolation offset using a pre-existing relationship which is present between these two variables, and then deriving an estimate of the parameter from the parameter bias. In another embodiment, this step comprises deriving the parameter estimate directly from the interpolation offset.

Figure 8:
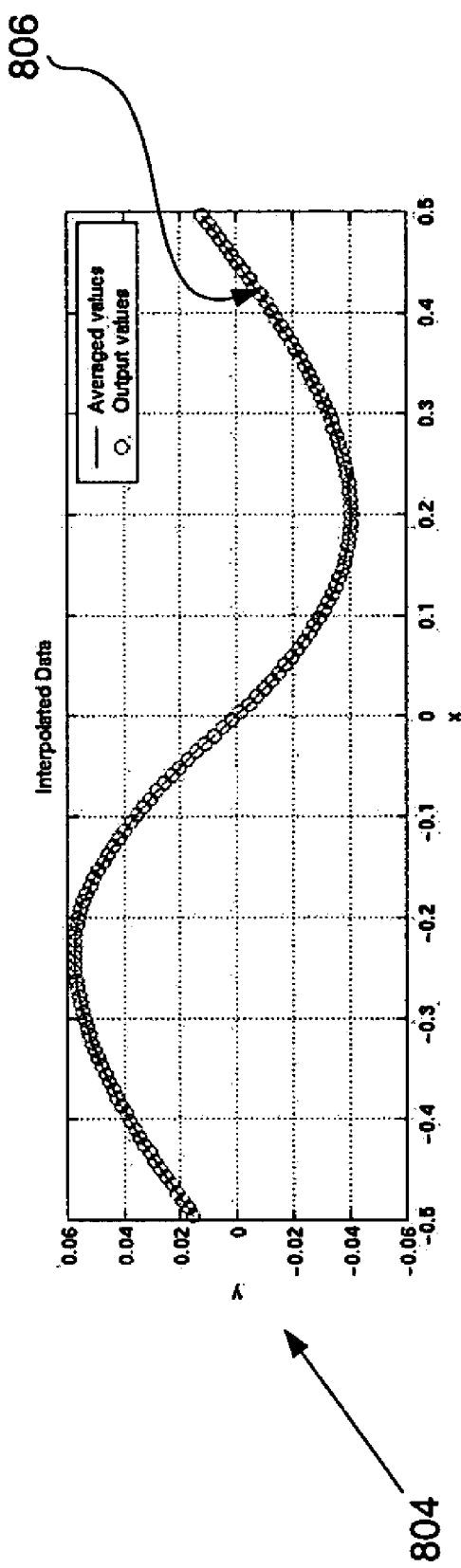
FIG. 8 illustrates an example of a pre-existing relationship between interpolation offset and code phase bias.

In one example, the interpolation offset is the deviation between the locations of interpolated and sampled peaks of the correlation function along the code phase dimension. A code phase bias bears a relationship with this interpolation offset which is illustrated in FIG. 8. Numeral 802 identifies the interpolation offset in terms of chips, numeral 804 identifies the code phase bias, and numeral 806 identifies a curve which embodies the relationship between these two variables. As can be seen, in this particular example, for an interpolation offset ranging between −0.5 and +0.5, the code phase bias ranges between −0.00405 to +0.0575 chips, which translates to −11.87 to +16.85 meters.

In one implementation of this example, the relationship between the interpolation offset and the code phase bias is embodied as a lookup table. Using this lookup table, a code phase bias is determined responsive to the interpolation offset. The code phase bias is added to the interpolation offset to form an estimate of the location of the peak along the code phase dimension. In this particular example, the estimate is in terms of a code phase offset between the sampled and actual peaks, but it should be appreciated that other forms of expressing the estimate are possible, such as the code phase offset between the interpolated and actual peaks. Moreover, in this particular example, an access to the lookup table yields a code phase bias which is then added to the interpolation offset to form the peak location estimate. However, it should be appreciated that embodiments are possible in which an access to the lookup table directly yields the peak location estimate.

An example of this lookup table is illustrated in FIG. 9. In this particular example, the lookup table has 129 entries, associated with table indices ranging from 0 to 128. The entry corresponding to index value 0 is identified with numeral 902a; the entry corresponding to index value 1 is identified with numeral 1; the entry corresponding to index value 2 is identified with numeral 2; and the entry corresponding to index value 128 is identified with numeral 902e.

The following equation maps the interpolation offset, interp_offset, to a table index, lut_index:

$$\text{lut\_index}=(\text{int})((\text{interp\_offset}+0.5)*(\text{lut\_size}-1)) \quad (1)$$

where int is the integer function, and lut_size is the size of the lookup table. In this particular example, lut_size is 129. For values of the interpolation offset which range between −0.5 and +0.5, this expression yields index values between 0 and 128.

Figure 10:
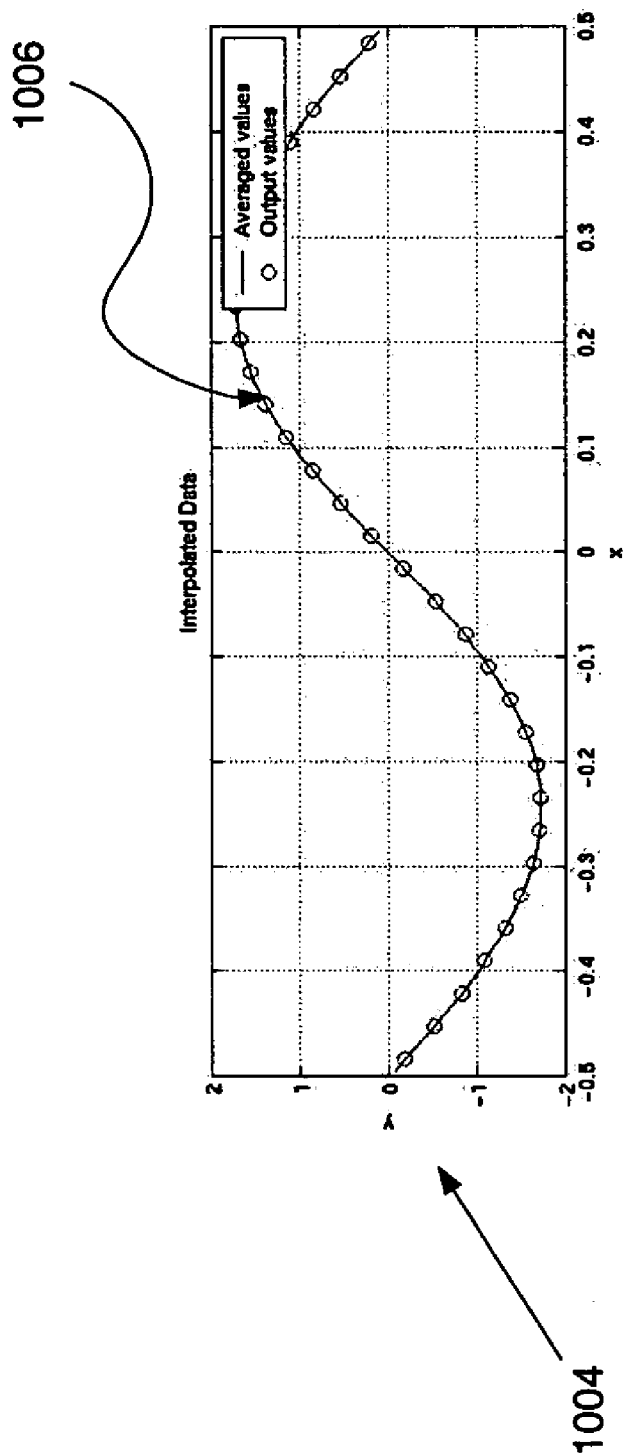
FIG. 10 illustrates an example of a preexisting relationship between interpolation offset and Doppler frequency bias.

In a second example, the interpolation offset is the deviation between the locations of interpolated and sampled peaks of a correlation function along the Doppler frequency dimension. A Doppler frequency bias bears a relationship with this interpolation offset which is illustrated in FIG. 10. The interpolation offset is identified with numeral 1002, the Doppler frequency bias is identified with numeral 1004, and a curve embodying the relationship between these two variables is identified with numeral 1006. As can be seen, for an interpolation offset ranging between −0.5 and +0.5, the Doppler frequency bias ranges between −2 to +2 Hz.

In one implementation of this example, the relationship is embodied as a lookup table. Using this lookup table, a Doppler frequency bias is determined which corresponds to the interpolation offset. This Doppler frequency bias is added to the interpolation offset to form an estimate of the location of the peak along the Doppler frequency dimension. In this particular example, the peak location estimate is in the form of a Doppler frequency offset between the sampled and actual peaks, but it should be appreciated that other forms of expressing the estimate are possible, such as in the form of an offset between the interpolated and actual peaks. Moreover, in this particular example, an access to the lookup table yields a Doppler frequency bias, but it should be appreciated that examples are possible where an access to the lookup table directly yields the peak location estimate.

Figure 11:
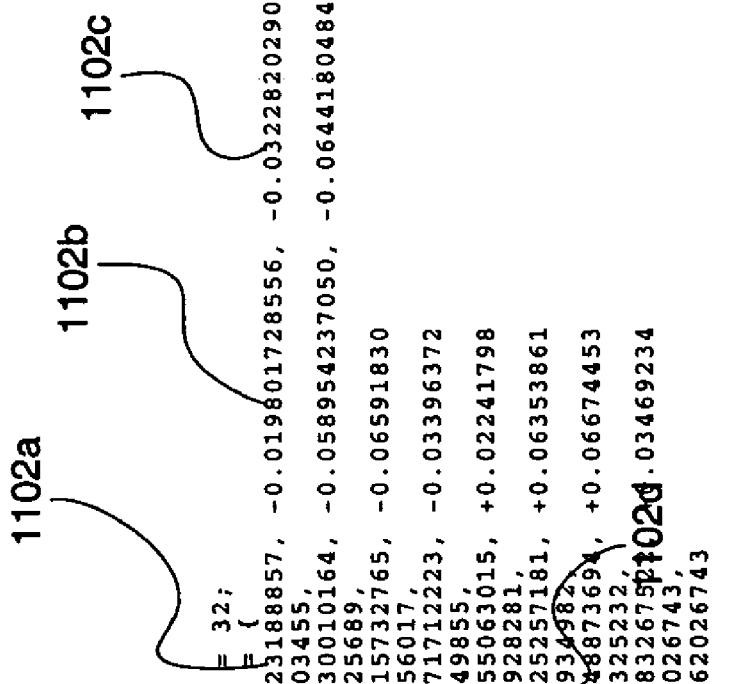
FIG. 11 illustrates an example of a lookup table implementing the relationship of FIG. 10.

An example of this lookup table is illustrated in FIG. 11. In this particular example, the lookup table has 33 entries, associated with table indices ranging from 0 to 32. The table entry corresponding to the index 0 is identified with numeral 1102a; the table entry corresponding to index value 1 is identified with numeral 1102b; the table entry corresponding to index value 2 is identified with numeral 1102c; and the table entry corresponding to index value 32 is identified with numeral 1102d.

The entries of the table illustrated in FIG. 11 are in terms of Doppler bins rather than Hz. The relationship between the size of Doppler bins and Hz in this example depends on the setting of $N_C$. In the case where $N_C$ is set to 20 ms, the size of a Doppler bin is 25 Hz. Equation (1) above, with lut_size set equal to 33, maps the interpolation offset into a table index.

Figure 12:
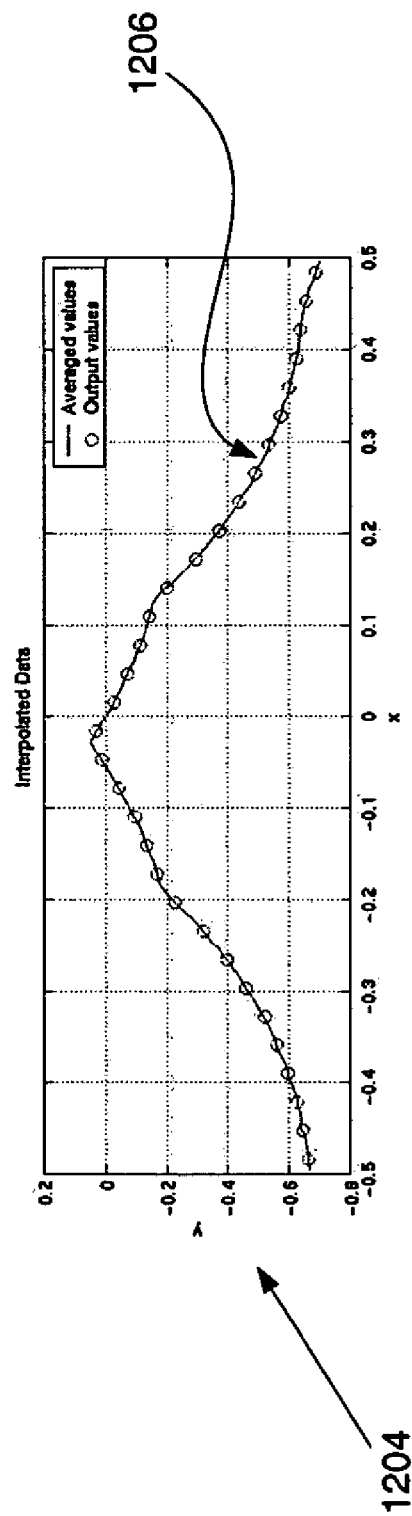
FIG. 12 illustrates an example of a pre-existing relationship between interpolation offset in the code phase dimension and peak energy bias.

In a third example, the interpolation offset is again the deviation between the locations of interpolated and sampled peaks along the code phase dimension. A peak energy bias bears a relationship with this interpolation offset which is illustrated in FIG. 12. The interpolation offset is identified with numeral 1202, the peak energy bias is identified with numeral 1204, and a curve embodying the pre-existing relationship between these two variables is identified with numeral 1206. The peak energy bias is in terms of $C/N_0$, expressed in units of dB-Hz. As can be seen, for values of the interpolation offset ranging from −0.5 to +0.5, the peak energy bias ranges from −0.69 to +0.14.

In one implementation of this example, this relationship is embodied as a lookup table. Using this lookup table, a peak energy bias is determined which corresponds to the interpolation offset. This peak energy bias is then added to the interpolated peak energy to form an estimate of the actual peak energy.

An example of this lookup table is illustrated in FIG. 13. In this particular example, the lookup table has 33 entries, associated with table index values ranging from 0 to 32. The entry corresponding to an index of 0 is identified with numeral 1302a; the entry corresponding to an index of 1 is identified with numeral 1302b; the entry corresponding to an index of 2 is identified with numeral 1302c; and the entry corresponding to an index of 32 is identified with numeral 1302d. Equation (1) maps an interpolation offset to a table index.

In this particular example, an access to the lookup table yields a peak energy bias which is subsequently added to the interpolated peak energy to form an estimate of the actual peak energy, but it should be appreciated that examples are possible where an access to the lookup table directly yields the estimate of the actual peak energy. Moreover, examples are possible where the estimate of the actual peak energy is formed by adding the peak energy bias to the sampled peak energy.

Figure 14:
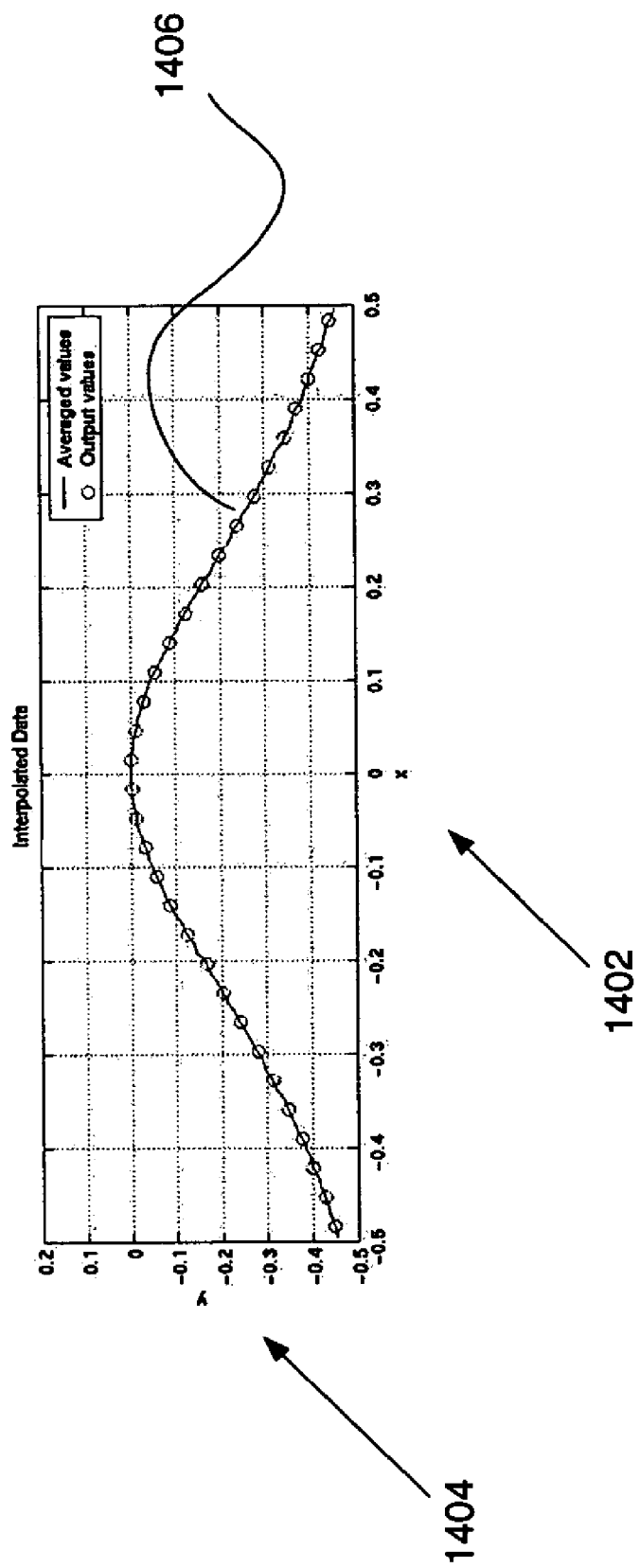
FIG. 14 illustrates an example of a pre-existing relationship between interpolation offset in the Doppler frequency dimension and peak energy bias.

In a fourth example, the interpolation offset is the deviation between the locations of the interpolated and sampled peaks along the Doppler frequency dimension. A peak energy bias bears a relationship with this interpolation offset which is illustrated in FIG. 14. The interpolation offset is identified with numeral 1402, the peak energy bias is identified with numeral 1404, and the curve embodying the relationship between these two variables is identified with numeral 1406. As can be seen, for values of the interpolation offset ranging from −0.5 to +0.5, the peak energy bias, which in this particular example is in terms of $C/N_o$ and is expressed in units of dB-Hz, ranges from −0.45 to 0.

In one implementation of this example, the relationship between these two variables is embodied as a lookup table. Using this lookup table, a peak energy bias is determined which corresponds to the interpolation offset. This peak energy bias is then added to the interpolated peak energy to form an estimate of the actual peak energy.

An example of this lookup table is illustrated in FIG. 15. In this particular example, the lookup table has 33 entries associated with values of the table index ranging from 0 to 32. The entry corresponding to an index of 0 is identified with numeral 1502a; the entry corresponding to an index of 1 is identified with numeral 1502b; the entry corresponding to an index of 2 is identified with numeral 1502c; and the entry corresponding to an index of 32 is identified with numeral 1502d. Equation (1) above maps between an interpolation offset to a table index.

In this particular example, an access to the lookup table yields a peak energy bias which is subsequently added to the interpolated peak energy to form an estimate of the actual peak energy, but it should be appreciated that examples are possible where an access to the lookup table directly yields an estimate of the actual peak energy. Moreover, examples are possible where the estimate of the actual peak energy is formed from the sum of the peak energy bias and the sampled peak energy.

Figure 16:
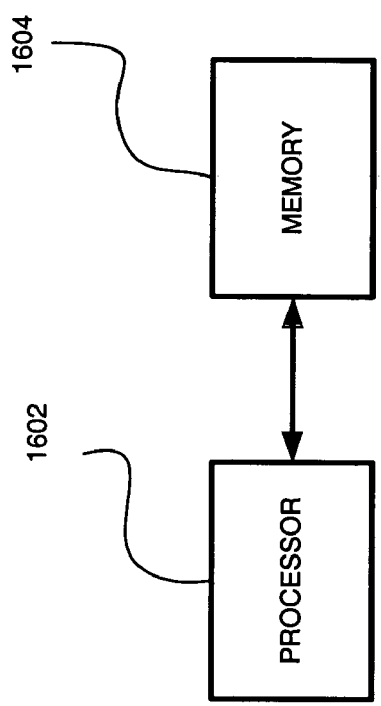
FIG. 16 is a block diagram of an embodiment of a system for estimating a parameter of a local maxima or minima of a function according to the invention.

An embodiment of a system for estimating a paramater of a local maxima or minima of a function is illustrated in FIG. 16. As illustrated, the system comprises processor 1602 and memory 1604. The memory 1604 tangibly embodies a series of instructions for performing the method of FIG. 7, or any of the embodiments, implementations, or examples thereof which have been described or suggested. The processor is configured to access and execute the software instructions tangibly embodied by memory 1604.

In one implementation, in which a parameter estimate or bias bears a relationship with the interpolation offset which is embodied as a lookup table, the lookup table is stored in the memory 1604, and accessible by the processor 1602 for determining the parameter estimate or bias corresponding to a particular value of the interpolation offset.

Figure 17:
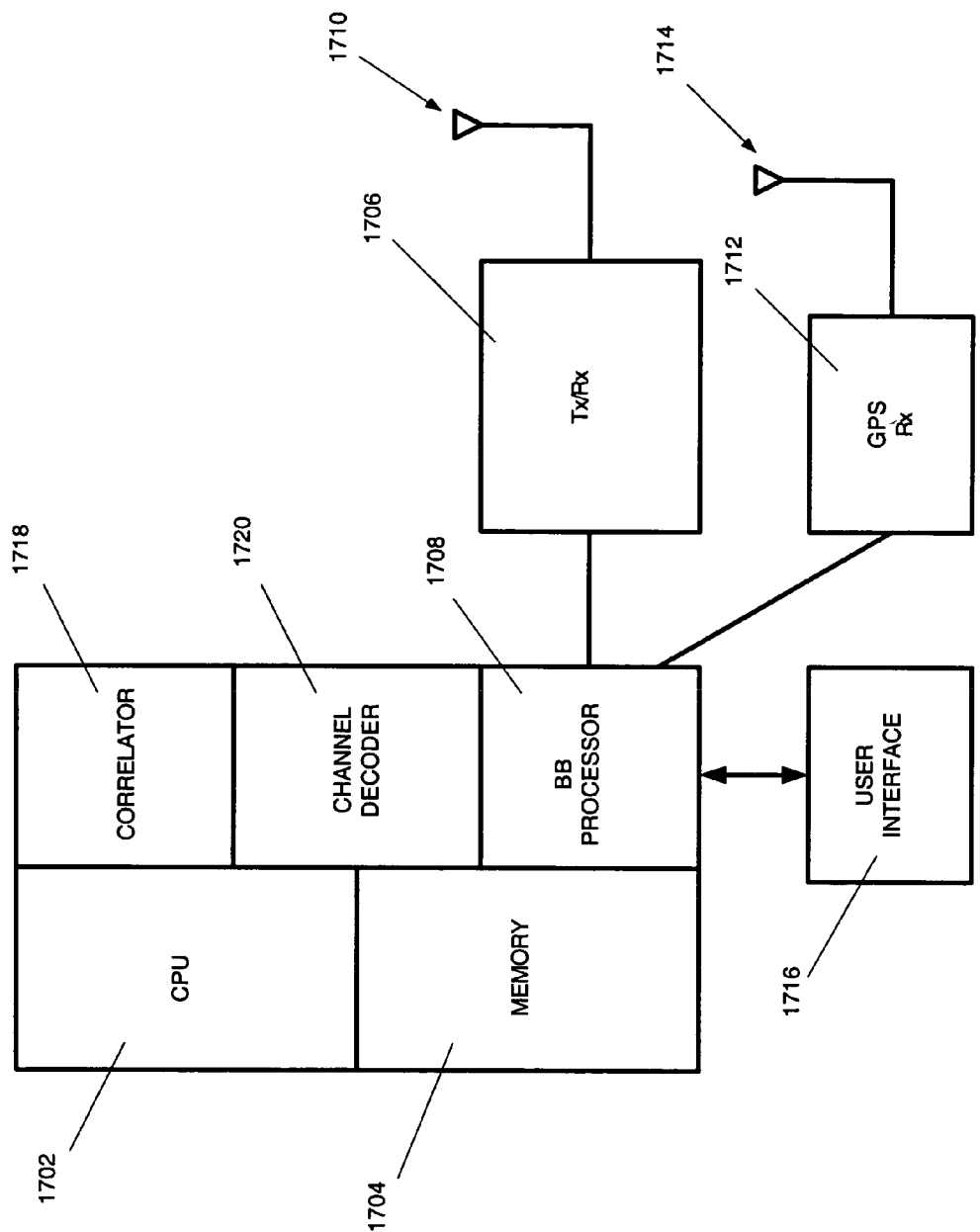
FIG. 17 is a block diagram of an embodiment of a subscriber station incorporating the system of FIG. 16.

An embodiment of a subscriber station in a wireless communication system is illustrated in FIG. 17. This particular subscriber station is configured to embody or incorporate the system of FIG. 16.

Radio transceiver 1706 is configured to modulate baseband information, such as voice or data, onto an RF carrier, and demodulate a modulated RF carrier to obtain baseband information.

An antenna 1710 is configured to transmit a modulated RF carrier over a wireless communications link and receive a modulated RF carrier over a wireless communications link.

Baseband processor 1708 is configured to provide baseband information from an input device within user interface 1716 to transceiver 1706 for transmission over a wireless communications link. Baseband processor 1708 is also configured to provide baseband information from transceiver 1706 to an output device within user interface 1716.

User interface 1716 comprises a plurality of devices for inputting or outputting user information such as voice or data. The devices typically included within the user interface include a keyboard, a display screen, a microphone, and a speaker.

GPS receiver 1712 is configured to receive and down-convert GPS satellite transmissions, and providing the down-converted information to correlator 1718.

Correlator 1718 is configured to derive GPS correlation functions from the information provided to it by GPS receiver 1712. For a given PN code, correlator 1720 produces a correlation function which is defined over a code phase dimension and a Doppler frequency dimension. In the code phase dimension, the correlation function is defined over a range of code phases which define a search window W. In the Doppler frequency dimension, the correlation function is defined over a plurality of Doppler frequency bins. Each individual correlation is performed in accordance with defined coherent and non-coherent integration parameters ($N_c$, M).

Correlator 1718 may also be configured to derived pilot-related correlation functions from information relating to pilot signals provided to it by transceiver 1706. This information is used by the subscriber station to acquire wireless communications services.

Channel decoder 1720 is configured to decode channel symbols provided to it by baseband processor 1708 into underlying source bits. In one example, where the channel symbols are convolutionally encoded symbols, the channel decoder is a Viterbi decoder. In a second example, where the channel symbols are serial or parallel concatenations of convolutional codes, the channel decoder 1720 is a turbo decoder.

Memory 1704 in configured to hold software instructions embodying the method of FIG. 7, or any of the embodiments, implementations, or examples thereof which have been described or suggested. CPU 1702 is configured to access and execute these software instructions to estimate parameters of local maxima or minima in the GPS correlation functions provided to it by correlator 1718.

Memory 1704 is also configured to hold lookup tables embodying the pre-existing relationships between an interpolation error and a parameter estimate or bias. In one example, CPU 1702 is configured to access and utilize these lookup tables to determine a parameter estimate or bias which corresponds to a particular interpolation offset.

CPU 1702 is configured to analyze the GPS correlation functions provided to it by correlator 1718, to isolate the local maxima or minima thereof, and to estimate parameters of or relating to these local maxima or minima using the method of FIG. 7, or any of the variants thereof which have been discussed or suggested.

CPU 1702 is also configured derive time and Doppler frequency measurements from these parameters. In addition, in one embodiment, CPU 1702 is configured to determine the root mean square error (RMSE) associated with each of the measurements. In this embodiment, these measurements and RMSE values are provided to a PDE (not shown). The PDE weights each of the measurements based on the inverse of its corresponding RMSE value, and then estimates the location and velocity of the subscriber station based on the weighted measurements. Alternatively, the subscriber station determines its own location and velocity from this information.

While various embodiments, implementations and examples have been described, it will be apparent to those of ordinary skill in the art that many more embodiments, implementations and examples are possible that are within the scope of this invention. In particular, embodiments are possible where the invention is employed to estimate parameters of local maxima or minima of functions other than correlation functions, or of correlation functions derived from signals transmitted by base stations in wireless communications systems, including omni base stations and individual sectors in a multi-sector cell, or of correlation functions derived from signals transmitted by in hybrid systems employing combinations of base stations and GPS satellites. Moreover, embodiments are possible where more than one parameter of a local maxima or minima of a function is estimated at a time. Consequently, the invention is not to be limited except in relation to the appended claims.

What is claimed is:

1. A method of estimating a parameter of a local maxima or minima of a function comprising:

performing interpolation on samples of the function at or near a local maxima or minima, resulting in an interpolated local maxima or minima;

deriving an interpolation offset comprising a deviation between locations of the interpolated local maxima or minima and a sampled local maxima or minima; and deriving an estimate of the parameter from the interpolation offset.

2. The method of claim 1 wherein the function is a correlation function.

3. The method of claim 2 wherein the correlation function is derived from a received signal.

4. The method of claim 2 wherein the second deriving step comprises deriving a parameter bias from the interpolation offset using a pre-existing relationship that is present between these two variables and then deriving an estimate of the parameter from the parameter bias.

5. The method of claim 4 wherein the interpolation offset comprises a deviation between locations of interpolated and sampled peaks along a code phase dimension.

6. The method of claim 5 wherein the parameter bias is a code phase bias.

7. The method of claim 6 wherein the parameter which is estimated is location of a peak along the code phase dimension, and an estimate of this parameter is derived from the code phase bias.

8. The method of claim 4 wherein the interpolation offset comprises a deviation between locations of interpolated and sampled peaks along a Doppler frequency dimension.

9. The method of claim 8 wherein the parameter bias is a Doppler frequency bias.

10. The method of claim 9 wherein the parameter which is estimated is location of a peak of the function along the Doppler frequency dimension, and an estimate of this parameter is derived from the Doppler frequency bias.

11. The method of claim 4 wherein the parameter bias is a peak energy bias.

12. The method of claim 11 wherein the parameter which is estimated is peak energy, and an estimate of this parameter is derived from the peak energy bias.

13. The method of claim 4 wherein the pre-existing relationship between the interpolation offset and the parameter bias is embodied as a lookup table.

14. The method of claim 13 wherein the second deriving step comprises directly deriving an estimate of the parameter from the interpolation offset through an access to the lookup table.

15. A memory tangibly embodying a sequence of software instructions for performing a method of estimating a parameter of a local maxima or minima of a function comprising:

performing interpolation on samples of the function at or near a local maxima or minima, resulting in an interpolated local maxima or minima;

deriving an interpolation offset comprising a deviation between locations of the interpolated local maxima or minima and a sampled local maxima or minima; and deriving an estimate of the parameter from the interpolation offset.

16. The memory of claim 15 wherein the function is a correlation function.

17. The memory of claim 16 wherein the correlation function is derived from a received signal.

18. The memory of claim 16 wherein deriving an estimate of the parameter from the interpolation offset comprises deriving a parameter bias from the interpolation offset using a pre-existing relationship which is present between these two variables and deriving an estimate of the parameter from the parameter bias.

19. The memory of claim 18 wherein the interpolation offset comprises a deviation between locations of interpolated and sampled peaks along a code phase dimension.

20. The memory of claim 19 wherein the parameter bias is a code phase bias.

21. The memory of claim 20 wherein the parameter is location of a peak along the code phase dimension, and an estimate of this parameter is derived from the code phase bias.

22. The memory of claim 18 wherein the interpolation offset comprises a deviation between locations of interpolated and sampled peaks along a Doppler frequency dimension.

23. The memory of claim 22 wherein the parameter bias is a Doppler frequency bias.

24. The memory of claim 23 wherein the parameter which is estimated is location of a peak of the function along the Doppler frequency dimension, and an estimate of this parameter is derived from the Doppler frequency bias.

25. The memory of claim 18 wherein the parameter bias is a peak energy bias.

26. The memory of claim 25 wherein the parameter which is estimated is peak energy, and an estimate of this parameter is derived from the peak energy bias.

27. The memory of claim 22 wherein the parameter bias is a peak energy bias.

28. The memory of claim 27 wherein the parameter which is estimated is peak energy, and an estimate of this parameter is derived from the peak energy bias.

29. The memory of claim 18 wherein the pre-existing relationship between the interpolation offset and the parameter bias is embodied as a lookup table.

30. The memory of claim 15 in combination with a processor, wherein the processor in configured to access and execute the sequence of software instructions tangibly embodied by the memory.

31. An apparatus for estimating a parameter of a local maxima or minima of a function comprising:

means for performing interpolation on samples of the function at or near a local maxima or minima, resulting in an interpolated local maxima or minima;

means for deriving an interpolation offset comprising a deviation between locations of the interpolated local maxima or minima and a sampled local maxima or minima; and means for deriving an estimate of the parameter from the interpolation offset.

* * * * *